(12) United States Patent  
Hurley

(10) Patent No.: US 7,497,283 B2
(45) Date of Patent: Mar. 3, 2009

(54) MOWER TRACTION DEVICE

(76) Inventor: Robert E. Hurley, 13202 Quarterhorse Run, Durham, NC (US) 27703

( * ) Notice: Subject to any disclaimer, the term of this patent is extended or adjusted under 35 U.S.C. 154(b) by 395 days.

(21) Appl. No.: 11/356,408

(22) Filed: Feb. 16, 2006

(65) Prior Publication Data
US 2007/0187157 A1 Aug. 16, 2007

(51) Int. Cl.
B62D 11/02 (2006.01)
B62D 6/00 (2006.01)

(52) U.S. Cl. ............... 180/6.2; 180/6.48; 180/6.5; 180/6.3; 180/24.12; 180/24.13; 180/19.1

(58) Field of Classification Search .......... 180/6.2, 180/6.48, 6.5, 6.3, 24.12, 24.13, 19.1
See application file for complete search history.

(56) References Cited

U.S. PATENT DOCUMENTS

| 4,211,297 | A | * | 7/1980 | Dunbar | 180/24.02 |
| 4,562,893 | A | * | 1/1986 | Cunard | 180/6.5 |
| 4,683,969 | A | * | 8/1987 | Littau | 180/6.48 |
| 4,707,971 | A | | 11/1987 | Forpahl et al. | |
| 4,735,038 | A | | 4/1988 | Williams | |
| 5,429,543 | A | * | 7/1995 | Tilbor et al. | 446/456 |
| 5,809,755 | A | * | 9/1998 | Velke et al. | 56/10.8 |
| 5,842,532 | A | * | 12/1998 | Fox et al. | 180/6.48 |
| 6,341,657 | B1 | * | 1/2002 | Hopely et al. | 180/6.5 |
| 6,364,041 | B1 | * | 4/2002 | Vangsgard | 180/24.12 |
| 6,390,225 | B2 | * | 5/2002 | Velke et al. | 180/333 |
| 6,601,665 | B2 | | 8/2003 | Hurlburt | |
| 6,634,445 | B2 | * | 10/2003 | Dix et al. | 180/6.48 |
| 6,830,114 | B2 | * | 12/2004 | Hammonds | 180/6.2 |
| 7,338,061 | B2 | * | 3/2008 | Bullis | 280/419 |

OTHER PUBLICATIONS

"Taking Turns" *Popular Mechanics* Jun. 1, 2000.
"My Zero Twin Scag Tiger Cub is Safer on My Hill" Sep. 24, 2003; Home & Garden, Website:http://www.epinions.com.

* cited by examiner

*Primary Examiner*—Paul N. Dickson
*Assistant Examiner*—Marlon A Arce Diaz
(74) *Attorney, Agent, or Firm*—Olive & Olive, P.A.

(57) ABSTRACT

A device for stabilizing traction in a zero turn mower having a riding frame, a pair of front caster-type wheels, a primary right-side rear wheel and a primary left-side rear wheel, and an asymmetric drive system to said rear wheels for driving and steering, comprising: a) auxiliary right-side and left-side rear wheels rotatably mounted on stub axles positioned rearwardly of said primary rear wheels; b) a first rigid member extending between and pivotally coupled to said auxiliary right-side rear wheel and said primary right-side rear wheel; c) a second rigid member extending between and pivotally coupled to said auxiliary left-side rear wheel and said primary left-side rear wheel; d) a first drive coupling member for driving said auxiliary right-side rear wheel in tandem with said primary right-side rear wheel; and e) a second drive coupling member for driving said auxiliary left-side rear wheel in tandem with said primary left-side rear wheel.

3 Claims, 5 Drawing Sheets

MOWER TRACTION DEVICE

BACKGROUND AND SUMMARY OF THE INVENTION

Zero turn radius mowers (also referred to as zero turn mowers) are speedy and low to the ground. The name "zero turn" refers to the ability of this type mower to turn on a very short radius. Zero turn type mowers have improved productivity for landscapers, grounds maintenance and commercial lawn care crews. However, zero turn type mowers also have hidden dangers when used on steep terrain. Riding a zero turn mower in areas with water, retaining wall drop-offs and slopes present a challenge due to the zero turn mower's center of gravity which can be relatively high when in operation and particularly when carrying a tall and heavy operator all of which can expose the operator to a strong possibility of rollover and serious personal injury. Since a zero turn mower is both highly maneuverable, and exceptionally fast it allows the operator to get the job done quickly. Therefore, operators of zero turn mowers tend to speed along at a high speed without realizing the risks involved. While many of the zero turn mower-related injuries that occur are the direct result of excessive speed, operation of a zero turn mower on sloped terrain in itself presents a challenge especially because of the nature of the front wheels.

The conventional zero turn mower currently available on the market has a set of caster wheels on the front and a pair of engine driven rear drive wheels on the back. Each rear wheel is independently driven and is independently controlled as to direction by means of an asymmetrical drive means between the engine and the rear drive wheel. By braking one rear wheel and driving the other rear wheel, the operator is able to make the mower rotate about a vertical axis, about which the rear drive wheels rotate. A serious problem arises when the conventional type of zero turn mower is driven transverse to a slope in that the mower tends to rotate somewhat as if it were making a zero turn and causes the operator to lose control and the mower to slip downhill. It is believed that this tendency to slip derives from the fact that the front caster-type wheels do not provide any steering input and therefore can, on a sloped terrain, permit the zero turn mower to point down slope and thereby risk going over an embankment or flipping over.

Many walk behind mowers also employ caster wheels and experience similar problems when operated on sloped terrain. The tendency of the caster wheels to point downwards on slopes permits a zero turn or walk behind type mower so equipped to lose traction and be difficult to maintain in a straight line.

As useful background, U.S. Pat. No. 4,735,038 illustrates a prior attempt to make a hand pushed powered lawnmower safer when on an embankment. U.S. Pat. No. 4,707,971 illustrates a prior attempt to make a riding type mower safer when on a slope. With regard to use of sprocket chain drives in the device of the present invention, note is made of U.S. Pat. No. 6,601,665 which illustrates a utility vehicle with one pair of midway disposed wheels driven through sprocket-chain drives by another pair of rearwardly disposed wheels, said pair of midway disposed wheels having the ability to change position relative to one another in correspondence with the nature of the terrain. Also felt to be useful as background is a relatively recent comparison of various kinds of zero turn mowers which is to be found in the *Popular Mechanics* article by Roy Berendsohn, entitled, "Taking Turns", published on Jun. 1, 2000. A discussion of the hill slipping problem dealt with by the present invention is discussed in the article "My Zero Twin Scag Tiger Cub is Safer on My Hill" published Sep. 24, 2003 by Epinions.com on its website http://www.e-pionions.com in its Home and Garden Section.

With the above background in mind, the device of the invention provides a mower with a set of front caster wheels and a set of rear driven wheels with auxiliary right and left wheels rotatably mounted on the rearward end of a pair of spaced apart rigid members which pivot on and extend rearward from the rear of the mower. Each auxiliary wheel of the device is driven, in the illustrated embodiments, by its own chain drive by a respective primary right or left drive wheel of the mower.

The device of the invention can either be incorporated in original mower equipment or be incorporated as an add-on to mowers with front caster-type wheels and a pair of driven rear wheels. The mowers may be either zero turn type mowers or walk behind type mowers. The device of the invention, in effect, stabilizes traction, especially on relatively steep sloped terrain by minimizing the tendency of the mower to slip when linearly traversing across a relatively steep sloped surface. The device of the invention furthermore provides for both increased friction between the mower's rear wheels and the ground as well as an auxiliary drive force whose inertia is asserted on the mower in a forward direction. The increased friction and drive force tend to minimize the tendency of the mower to turn downwards on a relatively steep slope.

DETAILED DESCRIPTION

Figure 1:
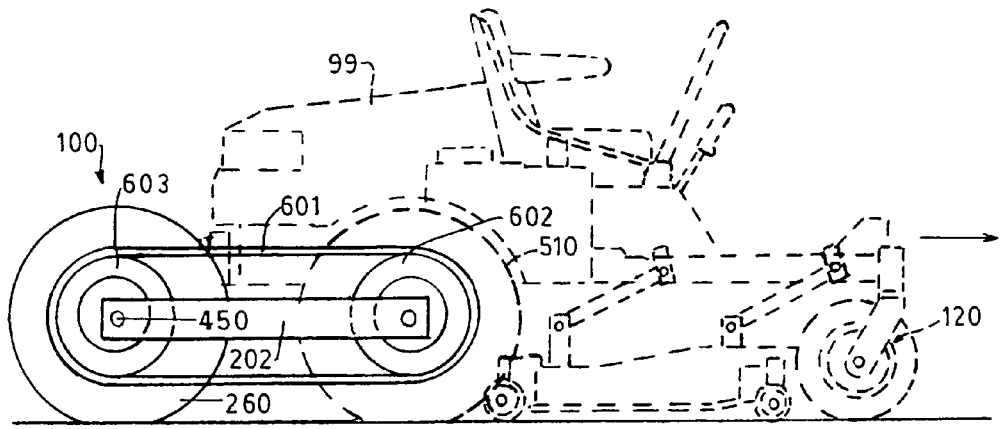
FIG. 1 is a side elevation view of the preferred and first embodiment of the invention device mounted on a typical zero turn mower, the mower being illustrated in dashed lines and shown as if operating on essentially level ground.
Figure 2:
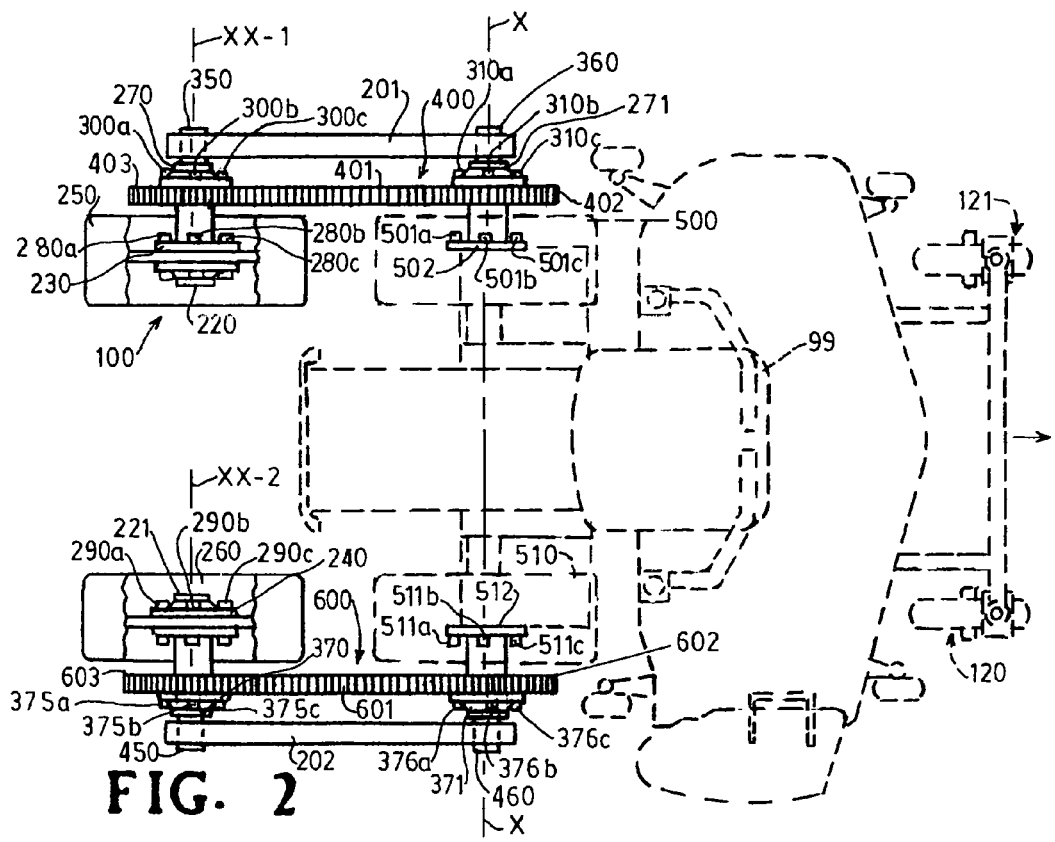
FIG. 2 is a top plan view of the preferred and first embodiment of the invention device showing both the axis whose position on the mower is always the same and extends through the pair of rear drive wheels, as well as the pair of separate independently positional axes about which the respective auxiliary wheels of FIG. 1 rotate, the mower being illustrated in dashed lines.

The preferred first embodiment of the traction device 100 is shown in FIGS. 1 through 5, 7 and 8. The typical riding type zero turn mower 99, shown in dashed lines, has front caster wheels as shown in FIG. 2 and illustrated by front right caster wheel 120 and front left caster wheel 121. As previously mentioned, the device 100 in the first embodiment of the invention, as in FIG. 1, provides the zero turn mower 99 with an auxiliary right rear wheel 260 and an auxiliary left rear wheel 250 (FIG. 2). Auxiliary wheels 250, 260 are mounted on the respective rear ends of rigid members 201 and 202 that pivot independently about axis X as well as about the respective auxiliary wheel axes XX-1 and XX-2.

As later explained, auxiliary left side rear wheel 250 is independently driven by primary left rear wheel 500 through one chain and sprocket drive and auxiliary right side rear wheel 260 is independently driven by primary right wheel 510 through another chain and sprocket drive.

Referring next to FIG. 2, auxiliary left side rear wheel 250 and auxiliary right side rear wheel 260 are rotatably mounted on respective stub axles 220 and 221. (When referring to a "wheel" in the application, it is intended that the term "wheel" include both the wheel and tire combination as typically employed on mowers.) Auxiliary wheels 250 and 260 are attached to hubs 230 and 240 respectively via a series of lug nuts 280a, 280b, 280c, and 280d (not shown) attaching wheel 250 to hub 230 and lug nuts 290a, 290b, 290c, and 290d (not shown) attaching wheel 260 to hub 240. Similarly, lug nuts 501a, 501b, 501c, and 501d (not shown) attach primary left side rear wheel to hub 502 and lug nuts 511a, 511b, 511c, and 511d (not shown) attach primary right side rear wheel to hub 512. The number and type of lug nuts are not critical to this invention and can be typical to mowers of this type. Auxiliary wheels 250 and 260, in the preferred embodiment, are of the same diameter and width as primary rear wheels 500 and 510, but in alternative embodiments may also be of a different diameter and width, as later explained.

With continuing reference to FIG. 2, it is to be noted that the front end of the rigid member 201 on the left side of the mower mounts and pivots on axle 360 whereas the rear end of rigid member 201 on the left side of the mower mounts and pivots on axle 350 whose position as well as that of the rear end of rigid member 201 relative to the position of axle 360 and the front end of rigid member 201 will vary with the smoothness of the terrain being traversed. Thus, the rear end of rigid member 201 on the left side of the mower can be thought of as pivoting on axle 350 as axle 350 moves up and down in correspondence with variations of the terrain.

With the just described mounting and operation of rigid member 201 on the left side of the mower in mind, it will also be seen in reference to FIG. 2 that the front end of the rigid member 202 on the right side of the mower mounts and pivots on axle 460 whereas the rear end of rigid member 202 on the right side of the mower mounts and pivots on axle 450 whose position as well as that of the rear end of rigid member 202 relative to the position of axle 460 and the front end of rigid member 202 will vary with the smoothness of the terrain being traversed. Thus, the rear end of rigid member 202 on the right side of the mower can be thought of as pivoting might be said to pivot on axle 450 as axle 450 moves up and down in correspondence with variations of the terrain.

In FIG. 2 axis X represents the axis about which the respective front ends of rigid members 201, 202 pivot and as also being the axis about which the primary right and left drive wheels 500, 502 rotate. In a similar manner, axis XX-1 represents the axis about which the rear end of rigid member 201 might be said to pivot as well as being the axis about which auxiliary left rear wheel 250 can be said to rotate. In a similar way, axis XX-2 represents the axis about which the rear end of rigid member 202 might be said to pivot as well as that about which auxiliary right rear wheel 260 can be said to rotate. To be kept in mind is the fact that on this first embodiment of the invention rigid members 201, 202 operate and swing up and down independently of each other and according to the nature of the terrain being mowed and even more specifically in accordance with the specific terrain over which each respective auxiliary which rolls.

With continuing reference to the first embodiment as shown in FIGS. 1-4, the mounting of auxiliary left rear wheel 250 is via axle 350 connecting to hub flange 270 and utilizing bolts 300a, 300b, 300c, and 300d (not shown), and the mounting associated with primary left side rear wheel 500 is via axle 360 connecting to hub flange 271 and utilizing bolts 310a, 310b, 310c and 310d (not shown). Also to be noted is that the mounting associated with auxiliary right rear wheel 260 is via axle 450 connecting to hub flange 370 and utilizing bolts 375a, 375b, 375c, and 375d (not shown) and that the mounting associated with primary right rear wheel 510 is via axle 460 connecting to hub flange 371 and utilizing bolts 376a, 376b, 376c and 376d (not shown).

Use of mountings typical in the art, such as those containing bearings, permit the described rigid members auxiliary and primary wheels to pivot and rotate in the manner described. Thus, the described form of mounting auxiliary left side rear wheel 250 on the rear end of rigid member 201 permits wheel 250 to rotate about its axis XX-1 passing through rigid member 201. Similarly the described form of mounting auxiliary right side rear wheel 260 on the rear end of rigid member 202 permits wheel 260 to rotate about its axis XX-2 passing through rigid member 202.

Figure 8:
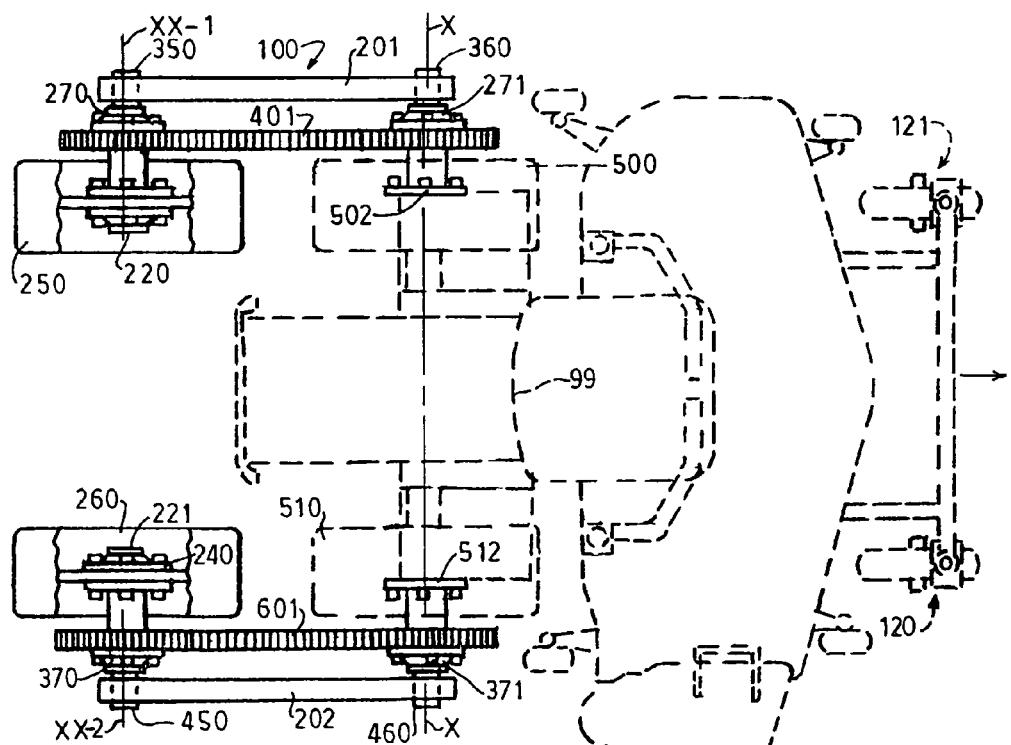
FIG. 8 is a top plan view further illustrating the axis about which the primary drive wheels rotate and about which the front ends of the rigid members pivot and individual independently positional axes about which the respective auxiliary rear wheels rotate and the respective rigid member rear ends are free to pivot.

The mounting arrangement at the forward end of rigid member 201 can thus also be said to permit auxiliary rear wheel 250 to pivot around the axis X of primary left side rear wheel 500 along an actuate path (not shown) so that auxiliary left side rear wheel 250 can move up and down along varying terrain and occupy a different and varying level than that occupied by the left side of primary rear wheel 500. In a similar manner, the mounting arrangement at the forward end of rigid member 202 on the left side permits rigid member 202 to pivot around axis X of the primary rear wheel 510 (the opposite primary rear wheel not being shown in FIG. 7) so that auxiliary rear wheel 260 can move up and down along varying terrain and occupy a different and varying level than that occupied by the right side primary rear wheel 510. As further illustrated by FIG. 7, auxiliary right side rear wheel 260 can follow the terrain without having to stay at the same level as that of either the primary right side rear drive wheel 510 or auxiliary left side rear wheel 250 due to the respective independently positional stub axles 350 and 450 on which the auxiliary rear wheels are mounted. Due to there being no axle connection in the first embodiment between the left side and right side auxiliary rear wheels 250 and 260, each auxiliary rear wheel can adjust to the terrain independent of the other auxiliary rear wheel. Primary wheels 500 and 510 can also move up and down in correspondence with varying terrain and during which the rear ends of rigid members 201 and 202 are permitted to pivot about their respective right axis XX-2 and left axis XX-1 as seen in FIG. 8. However, since the primary left side and right side rear wheels 500, 510 are interconnected along a common axis X, the primary rear wheels cannot independently adjust for differences in terrain as can the auxiliary rear wheels when mounted as in the first embodiment.

Stated differently in another example, when a zero turn mower equipped with the device of the invention according to the first embodiment is simply going up or down a slope, the primary wheels 500, 560 will be at a level either above or below the level of the auxiliary wheels and for either situation it can be seen that rigid members 201, 202 can effectively pivot about either of the respective axis X, XX-1 or XX-2 as required to meet the need.

The drive connection between the respective primary and auxiliary wheels is illustrated by way of example for each embodiment of the invention as being a sprocket-chain type assembly. Drive coupling assembly 400 (FIG. 2) on the left side of the mower basically consists of a chain 401, a sprocket 403 located on the auxiliary left side rear wheel hub flange 270 and a sprocket 402 located on the primary left side rear wheel hub flange 271 in the preferred embodiment. Drive coupling assembly 600 (FIG. 2) on the right side of the mower consists of a chain 601, a sprocket 603 located on auxiliary right side rear wheel hub flange 370 and a sprocket 602 located on primary right-side rear wheel hub flange 371. This arrangement permits drive coupling member 400 to drive auxiliary left side rear wheel 250 in tandem with primary left side rear wheel 500 and drive coupling member 600 to drive auxiliary right side rear wheel 260 in tandem with primary right side rear wheel 510. Due to the asymmetric drive system in a zero turn mower, drive coupling member 400 can operate at different speeds from drive coupling member 600. Alternative embodiments for the drive connection between the associated primary drive and auxiliary drive rear wheels may include a belt driven system as well as other alternative systems that permit the primary rear wheel to provide drive to its respective side auxiliary rear wheel. Also recognized is that the auxiliary rear wheels 250 and 260 may be of different diameters from those of primary rear wheels 500 and 510 and appropriate different constructions employed to adjust for the different diameter wheels.

It is also recognized that the space between primary and auxiliary rear wheels can vary from that of being a minimum to that of being a maximum that is still practical to permit maneuverability for the given terrain. The first and second embodiments are illustrated by way of example as being at somewhat of a midpoint.

Figure 3:
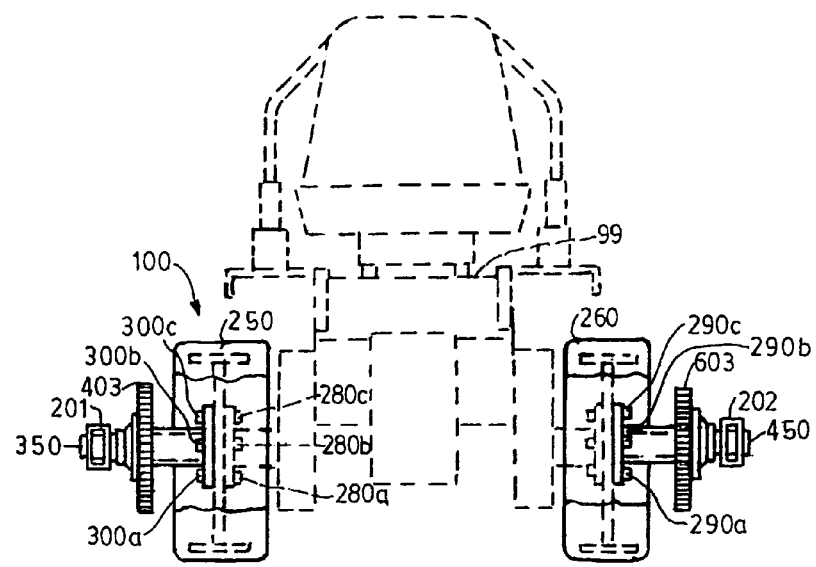
FIG. 3 is a rear elevation view of the preferred and first embodiment of the invention device of FIGS. 1 and 2 mounted on a zero turn mower, the mower being illustrated in dashed lines and shown as if operating on essentially level ground.
Figure 4:
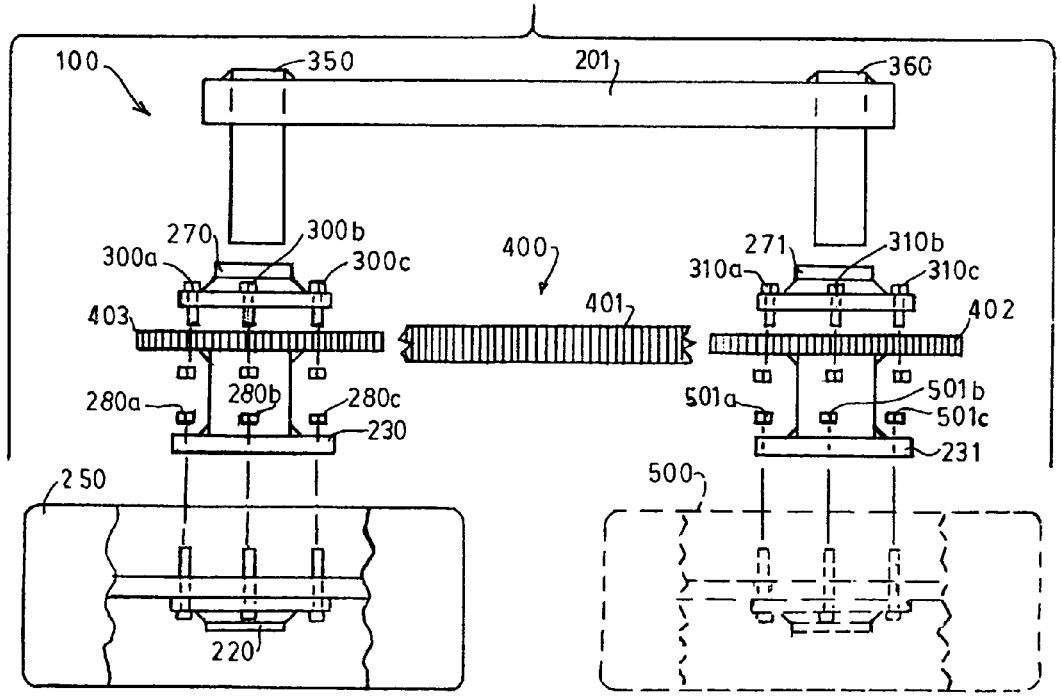
FIG. 4 is an enlarged, exploded, top plan view of the apparatus making up one side of the preferred and first embodiment of the invention device of FIGS. 1, 2, and 3 (there being an identical arrangement for the opposed side of the zero turn mower).

FIG. 4 is an enlarged, exploded, top plan view of one side of the preferred embodiment of the invention device of FIGS. 1, 2, 3, 5, 7 and 8 (there being an identical arrangement for the opposed side of the zero turn mower). For purposes of this detailed description, this will be described as the left hand side of device 100 from FIGS. 1, 2 and 3. Rigid member 201 mounts both auxiliary left wheel 250 and primary left rear drive wheel 500 via hub flange 270 and axle 350 for wheel 250 utilizing bolts 300*a*, 300*b*, 300*c*, and 300*d* (not shown), and hub flange 271 and axle 360 for wheel 500, utilizing bolts 310*a*, 310*b*, 310*c* and 310*d* (not shown). Left side drive connection 400 consists of chain 401, sprocket 403, located on the auxiliary left side rear wheel hub flange 270 and sprocket 402 located on primary left side rear drive wheel hub flange 271 in the preferred embodiment. This arrangement permits drive connection 400 to drive auxiliary left side rear wheel 250 in tandem with primary left side rear drive wheel 500. Auxiliary rear wheel 250 is attached to hub 230 and stub axle 220 via a series of lug nuts 280*a*, 280*b*, 280*c*, and 280*d* (not shown). Similarly, primary left side rear drive wheel 500 is attached to hub 231 via lug nuts 501*a*, 501*b*, 501*c* and 501*d* (not shown).

Figure 5:
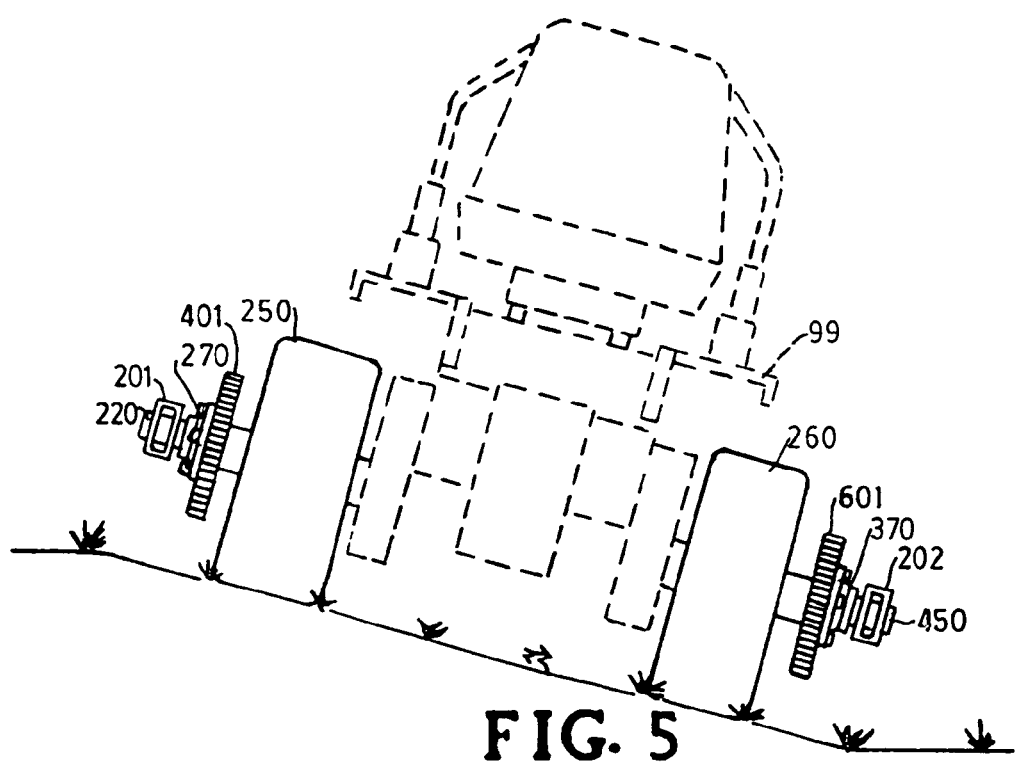
FIG. 5 is a rear elevation view of the preferred and first embodiment of the invention device of FIG. 3 with the zero turn mower situated on a downward relatively smooth sloping embankment, the mower being illustrated in dashed lines.

FIG. 5 is a rear elevation view similar to FIG. 3 but with the zero turn mower of the invention, in its first embodiment, being illustrated as situated on a downward sloping embankment further illustrating how, in this first embodiment, the independent auxiliary rear wheels are mounted on separate and independently positional stub axles with no connection between the two auxiliary rear wheels.

Figure 6:
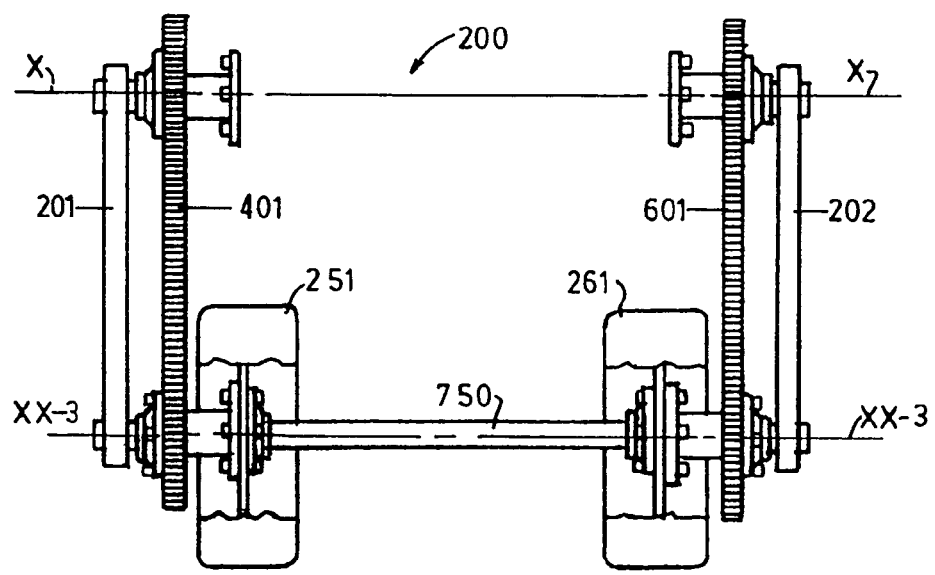
FIG. 6 is a top plan view of a second embodiment of the device of the invention which incorporates a free wheeling, connecting axle between the pair of auxiliary rear wheels of the invention device and about the axis of which both of the auxiliary rear wheels rotate and illustrating the structure of the second embodiment device of the invention only without the zero turn mower being illustrated.
Figure 7:
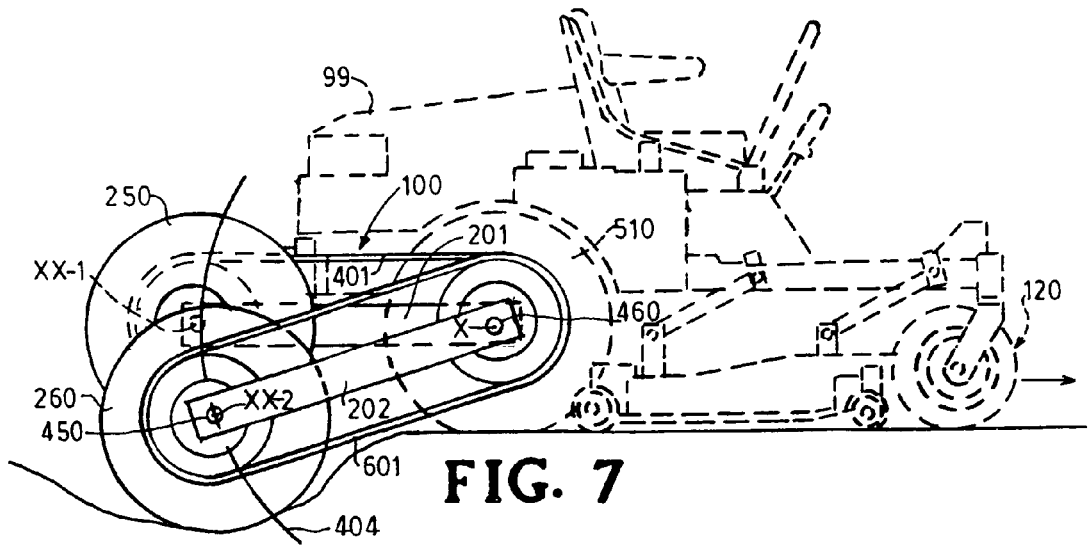
FIG. 7 is a side, somewhat schematic, elevation view of the preferred and first embodiment of the invention device mounted on a typical zero turn mower, the mower being illustrated in dashed lines and illustrating how, as the mower moves forward, each of the rigid members on the rear ends on each of which an auxiliary rear wheel is mounted are both free to pivot independently about the illustrated front axis "X" or about a respective auxiliary wheel rear axis XX-1 or XX-2 with the particular axis or multiple axes about which the rigid members pivot being dependent on the nature of the terrain being mowed.

FIG. 6 illustrates a second embodiment invention device 200 in which the right side and left side auxiliary rear wheels are joined by a freewheeling connecting axle 750 through which axis XX-3 extends and about which auxiliary rear wheels 251 and 261 rotate.

Figure 9:
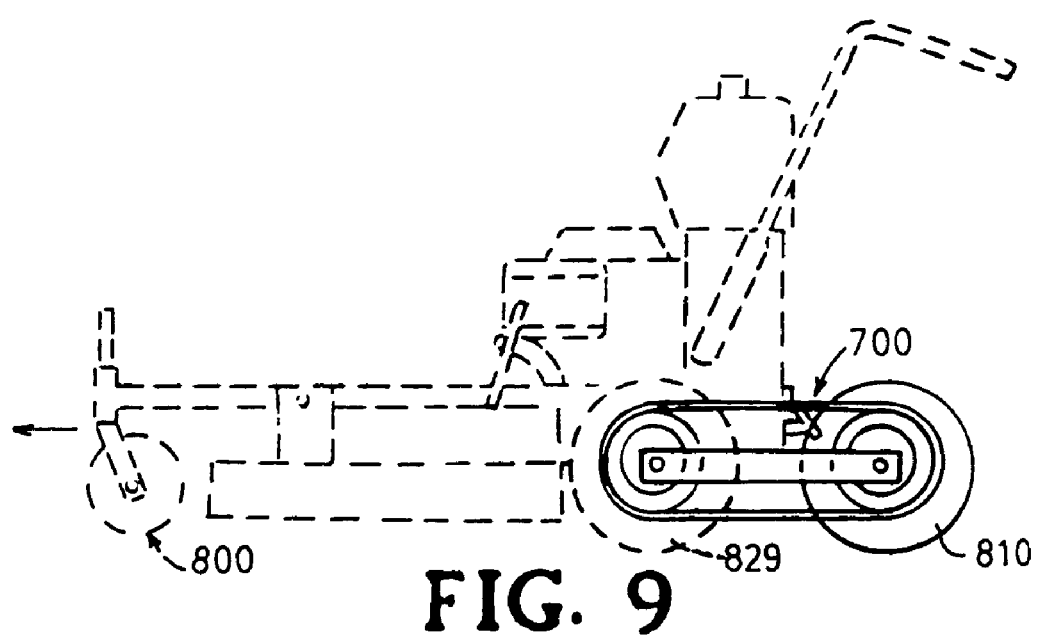
FIG. 9 is a side elevation view generally indicating an alternative third embodiment of the invention device for a walk behind mower having front caster wheels and driven rear wheels.

FIG. 9 is a side elevation view illustrating in a simplified way a third embodiment for a walk behind mower having front caster wheels 800 and driven rear wheels 829, 830 (not shown).

In this embodiment, the invention device 700 consists of a pair of driven primary wheels 829, 830 (not shown) and auxiliary rear wheels 810, 820 (not shown), as in the preferred embodiment, connected and driven in similar fashion to the device 100 of the first embodiment.

In summary, the device of the invention could be said to comprise an auxiliary safety apparatus adapted for being added to the rear of a zero turn mower of the type having a pair of free rolling front caster wheels mounted so as to be pivotal around their respective vertical axis, a pair of powered rear drive wheels and a mower frame mounting and extending between the pairs of caster and drive wheels and on which the operator sits, said auxiliary safety apparatus, comprising:
 (a) an auxiliary frame structure pivotally mounted on and extending rearwardly of said mower frame;
 (b) an auxiliary pair of wheels rotatably mounted on said auxiliary frame structure and arranged for being driven off said powered rear drive wheels of said mower; and
 (c) wherein said auxiliary safety apparatus when in use is operative to resist sliding and turning of said pairs of front caster and powered rear drive wheels downwardly on a slope when said mower moves across said slope.

The present embodiments of this device are thus to be considered in all respects as illustrative and not restrictive; all changes which come within the meaning and range of equivalency of the claims are intended to be embraced therein.

The invention claimed is:
1. An asymmetrical drive vehicle comprising:
 (a) a base structure;
 (b) an engine for powering said vehicle;
 (c) a first pair of laterally spaced left and right caster-type wheels mounted on a forward end of said base structure;
 (d) a second pair of laterally spaced left and right wheels mounted on a rearward end of said base structure;
 (e) a third pair of laterally spaced left and right wheels mounted on said rearward end of said base structure and in respective longitudinal alignment with but located behind said second pair of wheels;

(f) first asymmetrical drive means connected between said engine and said second pair of wheels;

(g) mounting means extending between said second and third pairs of laterally spaced left and right wheels;

(h) second drive means operatively associated with said second and third pairs of laterally spaced left and right side wheels and enabling said second pair of wheels to drive said third pair of wheels;

(i) manual control means enabling said second pair of wheels to be driven by said drive means and to rotate either at the same speed and in the same direction or at selected different speeds and directions whereby to provide a means for steering said vehicle; and (j) wherein said base structure, engine, wheels, first drive means, mounting means, second drive means, and control means comprise an integral assembly.

2. A vehicle as claimed in claim 1 wherein said vehicle comprises a zero turn type riding lawnmower arid includes an operator seat mounted on said base structure.

3. A device for stabilizing traction in a mower of the type having a pair of front caster-type wheels, a primary right side rear wheel and a primary left side rear wheel, and a drive system to said rear wheels, comprising:

a. an auxiliary right side rear wheel rotarably mounted about an aids on a first stub axle positioned rearward of said primary right side rear wheel;

b. an auxiliary left side rear wheel rotatably mounted about an axis on a second stub axle positioned rearward of said primary left side rear wheel;

c. a first rigid member extending between and providing pivotal mounts for both said auxiliary right side rear wheel and said primary right side rear wheel;

d. a second rigid member extending between and providing pivotal mounts for both said auxiliary left side rear wheel and said primary left side rear wheel;

e. a first drive coupling member for driving said auxiliary right side rear wheel in tandem with said primary right side rear wheel;

f. a second drive coupling member for driving said auxiliary left side rear wheel in tandem with said primary left side rear wheel; and g. wherein said mower is a walk behind type of mower.

\* \* \* \* \*